May 11, 1965   R. L. HAWKS   3,182,418
AUTOMATIC HOOKER
Filed Feb. 19, 1964
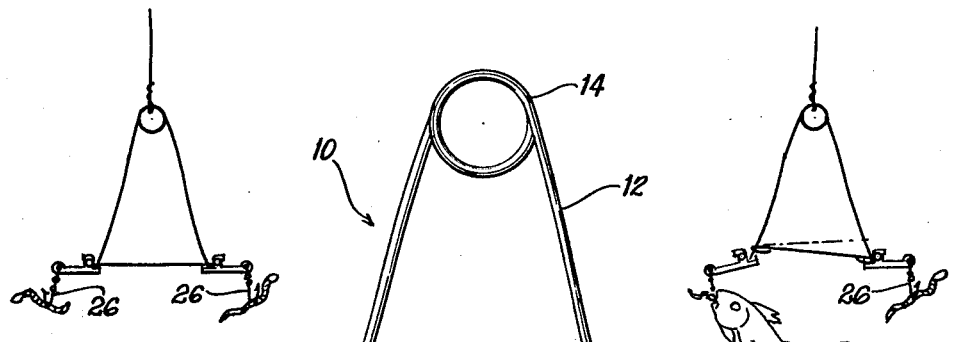
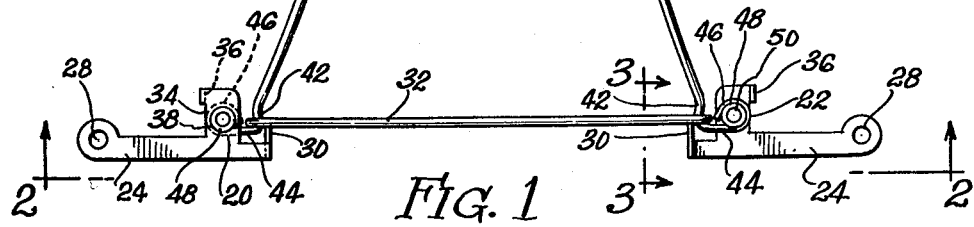
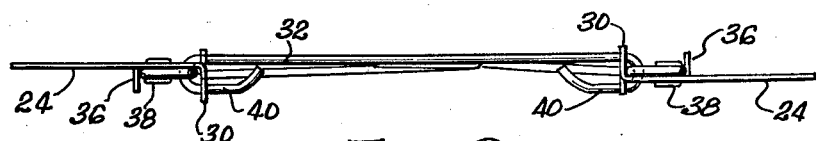
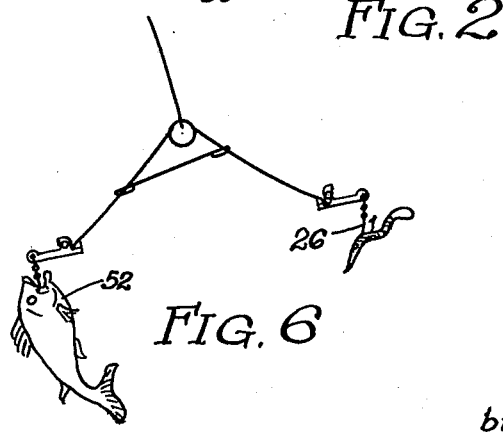
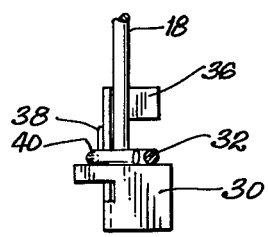
INVENTOR
Robert L. Hawks
by McDougall, Hersh & Scott
Att'ys 3,182,418
AUTOMATIC HOOKER
Robert L. Hawks, Chicago, Ill., assignor to F & F Enterprises, Inc., Chicago, Ill., a corporation of Illinois
Filed Feb. 19, 1964, Ser. No. 345,896
15 Claims. (Cl. 43—15)

This invention relates to a piece of fishing tackle and it relates more particularly to a device which operates suddenly to set a fishhook in hooking a fish responsive to movement of the hook as the bait on the end of the hook is taken by the fish.

Ordinarily, a fishhook is set in the fish responsive to a jerk effected by pulling the line when a bobbin signals that a fish has taken the bait. This not only necessitates complete alertness at all times on behalf of the fisherman to catch the signal but, very often, the reaction of the fisherman is not quick enough or effective after the signal is given to catch the fish onto the end of the hook. As a result, the fish often escapes even after the bait has been taken from the end of the hook.

It is an object of this invention to provide a means on which the fishhook is supported and which reacts responsive to movement when the bait is taken by the fish automatically to jerk the hook in a manner to set the hook while in the fish's mouth thereby to increase the chances of catching the fish.

Another object is to provide a new and improved piece of fishing tackle which is adapted to be secured onto the end of a fish line for support of one or more fishhooks and it is a related object to provide a piece of fishing tackle of the type described which is inexpensive, simple in construction, easy in operation, and which is effective to increase the catch of fish.

These and other objects and advantages of this invention will hereinafter appear and for purposes of illustration, but not of limitation, an embodiment of the invention is shown in the accompanying drawing, in which—

FIG. 1 is an elevational view of the piece of fishing tackle embodying the features of this invention showing the arrangement of elements in tensioned and cocked relation;

FIG. 2 is a view taken along the line 2—2 of FIG. 1;

FIG. 3 is a sectional view taken along the line 3—3 of FIG. 1;

FIG. 4 is an elevational plan view of the tackle of FIG. 1 in position of use on the end of a fish line;

FIG. 5 is an elevational view similar to that of FIG. 4 showing the arrangement of elements as they are being sprung; and FIG. 6 is an elevational view similar to those of FIGS. 4 and 5 showing the arrangement of elements in sprung position with a fish caught onto the end of a fishhook.

Referring now to the drawing, the piece of fishing tackle 10 embodying the features of this invention comprises a length of spring wire 12 formed with a looped portion 14 in the central portion thereof and with the free end portions, hereinafter referred to as spring arms 16 and 18, extending outwardly from the loop normally at a rather wide angle of less than 180° but more than 30° and preferably more than about 60°.

Pivoted intermediate its ends onto each of the ends 20 and 22 of the spring arms 16 and 18 is a trigger arm 24 in the form of an elongate member of relatively rigid construction, such as may be formed of a strip of metal, plastics, fiber reinforced plastics, wood and the like. Means are provided on the outer end of the trigger arm for support of a fishhook 26, such means being illustrated as an eyelet 28 onto which the fishhook 26 can be secured to depend from the arm in free swinging movement.

On the side of the pivot opposite the fishhook securing means, the end portion of the arm 24 is formed with an actuator means, such as an upstanding flange 30 adapted to be engaged by a holder rod 32 operatively engaging the outer ends of the spring arms for releasably retaining the arms in a tensioned relationship.

Intermediate its ends, the trigger arm 24 is formed with an upstanding projection 34 having an edge portion turned to provide a crosswise extending flange 36 which spans the plane of the spring arms 16 on which the trigger arm is pivotally mounted to engage the spring arm as a stop when the trigger arm rotates excessively about its pivot 38, as when the abutment 36 on the trigger arm to the left in FIG. 1 rotates clockwise to bring the abutment 36 into engagement with the outer side of the spring arm 16.

Operatively engaging the spring arms 16 and 18 is a holder mounted for free sliding movement along the lengths of the spring arms and which is dimensioned to have a length less than the distance between the ends of the spring arms when the latter are in normal relaxed position and which includes means for releasably securing the holder in position of use between the end portions of the spring arms for holding the arms in their tensioned relationship with a portion of the holder lying in the path of the flange 30 to cock the trigger arm 24 when in position of use and to be released by the trigger arm responsive to movement thereof about its pivot to free the spring arms for the desired spring action.

For this purpose, the holder 32 is formed of a length of wire or other resilient member formed with loops 40 or openings on the opposite end portions with one of the spring arms 16 extending through one of the openings while the other extends through the other of the openings thereby to enable the holder 32 freely to slide along the length of the spring arms. The distance between the openings 40 of the holder is dimensioned to be greater than the distance of the spring arms near the looped portion 14 but less than the distance between the ends of the spring arms when the latter are in relaxed position. As a result, when the holder is displaced toward the end portions of the spring arms, the spring arms will be cammed by the holder in the direction towards each other with the distance between the end portions of the arms corresponding to the length of the holder between the engaging openings thereby to tension the arms when in position of use.

Means are provided on the end portions of the arms releasably to retain the holder 32 when displaced to tensioned position thereby to tension the arms and cock the device. For this purpose, a portion 42 spaced a short distance from the end of each spring arm is formed with an angled section 42 followed by a portion 44 which extends substantially perpendicularly outwardly from the end thereof with means on the end of the outwardly extending portion pivotally to mount the trigger arm 24. In the illustrated modification, such means comprises a loop 46 formed on the end about a recess in a rivet 48 extending through an opening 50 in the portion of the trigger arm intermediate its ends and preferably off-set in the direction away from the hook end so that the leverage about the pivot will be substantially in favor of the hook end. The angle to which the section 42 is bent is such as to align the angled portions in the respective spring arms 16 and 18 when the arms are in their tensioned relationship thereby to provide a rest for the holder which enables the holder to be releasably retained therebetween. The angle may be slightly greater so that the angled section 42 will define a slightly recessed portion thereby to provide for greater stability in retaining the holder therebetween in the cocked position but such greater angled portion will introduce lesser sensitivity.

In operation, a fishhook 26 is secured to the end of the trigger arm 34. As the holder 32 is displaced outwardly along the spring arms, the pair of arms are cammed in the direction towards each other from their relaxed position to a tensioned relation. As the holder passes over into the bent portions 42 it engages the upstanding flange 30 of the trigger arm 24 to rock the trigger arm 24 about its pivot until it extends substantially horizontally therefrom in cocked position. The ends of the holder 32 become seated between the parallel arranged bent portions releasably to hold the arms in their tensioned relation with the trigger arm cocked. This relationship is illustrated by the arrangement of elements in FIGS. 1 and 4.

When the bait is taken by a fish 52, as illustrated in FIG. 5, the trigger arm 24 is rocked about its pivot in a downward direction. This will correspondingly raise the flange 30 at the opposite end portion of the trigger arm against the underside of the holder 32 to displace the holder inwardly along the spring arm. When the holder clears the bent portion 42 in which it is seated, the spring arm becomes free immediately to return to the relaxed position. This imparts an instantaneous jerk to the elements associated therewith, as illustrated in FIG. 6. The jerk will be upwardly and about relative to the looped portion 14 so that the fishhook will be displaced in a direction adapted to set the hook in the mouth of the fish whereby the fish will become caught on the hook.

The device is illustrated with a trigger arm pivotally mounted on the end of each of the spring arms. Since the device will be sprung by only one of the hooks, the other arm often serves no useful purpose except to present two baits instead one. Once the device is sprung by one of the hooks, the spring system will no longer be available to the other until the device is reset. Thus the concept of this invention may be applied to a system wherein the trigger arm and hook is provided only on one end of a spring arm while the other spring arm functions solely as means cooperating with the first arm to establish means for receiving the holder in tensioned relation.

It will be apparent from the foregoing that I have provided a simple and inexpensive piece of fishing tackle which is adapted for effective use in catching fish and which is responsive substantially instantaneously to the fish taking the bait to set the device into action.

It will be understood that changes may be made in the details of construction, arrangement and operation without departing from the spirit of the invention, especially as defined in the following claims.

I claim:

1. A piece of fishing tackle comprising a length of spring material formed with a looped portion at about its center and with spring arms extending outwardly from the looped portion in angular relationship one with the other, an inwardly turned portion adjacent the ends of each of the arms arranged to provide a seat therebetween when the arms are displaced inwardly in the direction towards each other from their relaxed position to a tensioned position and an end portion extending outwardly from the ends of the inwardly turned portions, a trigger arm comprising an elongate member, means pivotally mounting the trigger arm intermediate its ends onto the end of a spring arm for rocking movement between cocked and uncocked positions, said trigger arm having means on the outer end portion for attachment of a fishhook and abutment means on the inner end portion, an elongate holder member dimensioned to have an effective length less than the distance between the ends of the spring arms when in their relaxed position and means on the end portions of the holder member slidably engaging the spring arms to tension the spring arms when the holder is displaced endwise of the arms onto the turned-in portions wherein the holder becomes seated releasably to maintain the spring arms in tensioned relation, said holder having a portion lying in the path of the abutment means on the end of the trigger arm for engagement with said abutment means pivotally to rock the trigger arm to cocked position about its pivot when the holder is displaced to tensioned position and to be displaced to seat when the trigger arm is rocked to uncocked position.

2. A piece of fishing tackle as claimed in claim 1 in which the length of spring material comprises an elongate spring wire.

3. A piece of fishing tackle as claimed in claim 1 in which the length of spring material comprises a plastic strip.

4. A piece of fishing tackle as claimed in claim 1 in which the spring arms extend outwardly from the looped portion at an angle less than 180° but more than 30° when in relaxed position.

5. A piece of fishing tackle as claimed in claim 1 in which the spring arms extend from the looped portion at an angle less than 180° but more than 60° when in relaxed position.

6. A piece of fishing tackle as claimed in claim 1 in which the inwardly turned portions are substantially parallel one with the other when the arms are in their tensioned position.

7. A piece of fishing tackle as claimed in claim 1 in which the inwardly turned portions extend at a slight angle in the direction towards each other when the arms are displaced to tensioned position thereby to define a recessed portion in which the holder means can become seated.

8. A piece of fishing tackle as claimed in claim 1 in which the outwardly extending end portion is substantially perpendicular from the outer end of the in-turned portion.

9. A piece of fishing tackle as claimed in claim 1 in which the means pivotally mounting the trigger arm onto the end of the spring arm comprises a loop on the end of the spring arm and a grommet fixed to the trigger arm on which the loop is rotatably received.

10. A piece of fishing tackle as claimed in claim 1 in which the pivot is offset from the center of the trigger arm in the direction towards the abutment.

11. A piece of fishing tackle as claimed in claim 1 in which the abutment comprises a crosswise extending flange projecting upwardly from the end portion of the trigger arm.

12. A piece of fishing tackle as claimed in claim 1 which includes a forwardly facing abutment on the trigger arm positioned above the pivot to engage the spring arm during rotational movement of the spring arm in uncocked position thereby to limit such movement.

13. A piece of fishing tackle as claimed in claim 1 in which the holder comprises an elongate rod.

14. A piece of fishing tackle as claimed in claim 1 in which the holder comprises an elongate rod and openings on the opposite end portions of the rod through which the spring arms slidably extend.

15. A piece of fishing tackle comprising a unitary length of spring material having a looped portion substantially midway between its ends with the remainder extending angularly outwardly therefrom as spring arms, an elongate holder member extending crosswise between the spring arms and operatively engaging the arms for free sliding movement thereon, said spring arms having a portion spaced inwardly from the ends turned inwardly by an amount to extend substantially parallel one from the other when the spring arms are tensioned in the direction towards each other to space the turned-in portions by an amount corresponding to the effective length of the holder member, a trigger arm in the form of an elongate member, means on the outer end of the trigger arm for attachment of a fishhook, means on the inner end portion of the trigger arm positioned operatively to engage the holder member when the latter is seated between the in-turned portions releasably to maintain the spring arms in tensioned relation, and means pivotally mounting the trigger arm intermediate its ends onto the end portion of a spring arm for rocking movement between cocked and uncocked position.

References Cited by the Examiner
UNITED STATES PATENTS

| | | | |
|---|---|---|---|
| 1,251,810 | 1/18 | Oehler | 43—43.15 X |
| 2,431,420 | 11/47 | Pope | 43—43.15 X |
| 2,620,590 | 12/52 | Shaw | 43—89 |
| 2,644,264 | 7/53 | Heki | 43—36 |
| 2,948,985 | 8/60 | Kizer | 43—34 X |

FOREIGN PATENTS 14,386   8/05   Norway.

ABRAHAM G. STONE, *Primary Examiner.*